United States Patent [19]
Zeitler et al.

[11] 3,949,019
[45] Apr. 6, 1976

[54] PROCESS FOR THE MANUFACTURE OF GRAFT POLYMERS

[75] Inventors: Gerhard Zeitler, Hessheim; Heinz Mueller-Tamm, Ludwigshafen; Friedrich Urban, Limburgerhof, all of Germany

[73] Assignee: BASF Aktiengesellschaft, Ludwigshafen (Rhine), Germany

[22] Filed: Aug. 15, 1974

[21] Appl. No.: 497,572

[30] Foreign Application Priority Data
Aug. 23, 1973  Germany............................ 2342486

[52] U.S. Cl............................................ 260/878 R
[51] Int. Cl.² .............. C08F 265/04; C08F 255/00; C08L 23/26
[58] Field of Search ................................ 260/878 R

[56] References Cited
UNITED STATES PATENTS
3,177,269  4/1965  Nowak et al.................... 260/878 R
3,177,270  4/1965  Jones et al. ..................... 260/878 R
3,862,265  1/1975  Steinkamp et al. ............. 260/878 R Primary Examiner—Alan Holler
Attorney, Agent, or Firm—Johnston, Keil, Thompson & Shurtleff

[57] ABSTRACT

Process for the manufacture of graft polymers from copolymers of ethylene with vinyl esters, acrylates or methacrylates by grafting an ethylenically unsaturated carboxylic acid thereto in the presence of a free-radical polymerization initiator. Homogeneous graft copolymers are obtained from which sheeting can be made. To this end, the unsaturated carboxylic acid is first caused to diffuse into the copolymer and the mixture is then extruded at temperatures above the crystallite melting point of the ethylene copolymer.

3 Claims, No Drawings

PROCESS FOR THE MANUFACTURE OF GRAFT POLYMERS

This application discloses and claims subject matter described in German Patent Application P 23 42 486.4, filed Aug. 23, 1973, which is incorporated herein by reference.

This invention relates to a process for the manufacture of graft copolymers of ethylene copolymers and ethylenically unsaturated carboxylic acids by polymerization of the ethylenically unsaturated carboxylic acids in the presence of ethylene copolymers and free-radical polymerization initiators.

There are only a few types of process for grafting watersoluble monomers such as ethylenically unsaturated carboxylic acids onto ethylene/vinyl acetate copolymers. For example, an ethylenically unsaturated carboxylic acid may be grafted onto ethylene/vinyl acetate copolymer in an inert solvent and in the presence of free-radical polymerization initiator. However, this process is not acceptable economically. One industrially feasible method consists in reacting a molten ethylene copolymer with a mixture of an ethylenically unsaturated carboxylic acid and a free-radical polymerization initiator. This polymerization reaction is carried out, for example, in a kneader or extruder. The products obtained in this manner are satisfactory for a number of applications. When the ethylenically unsaturated monomers are fed to the polymer melt, the high temperature of the latter causes accelerated polymerization of the ethylenically unsaturated monomers with the result that some homopolymer is formed and therefore non-uniform graft copolymers are produced. Sheeting made from these products is useless, since it contains a large number of fish-eyes. Sometimes the very manufacture of such sheeting causes difficulty due to the formation of holes at the fish-eyes.

In the process described in German Published Application 1,720,256, the polymer is mixed with a free-radical initiator and the resulting mixture is caused to react with a vinyl monomer in the molten state with stirring. Even in this case, the products obtained contain both chemically combined and physically blended vinyl polymer. These products are non-uniform and not suitable for the manufacture of sheeting.

It is an object of the invention to modify the above-described process so as to produce homogeneous graft polymers from which sheeting may be prepared.

This object is achieved according to the invention by using shaped articles of an ethylene/vinyl ester, ethylene/acrylate or ethylene/methacrylate copolymer having a diameter of from 1 to 10 mm and causing from 0.5 to 10% by weight, based on the ethylene copolymer, of an ethylenically unsaturated carboxylic acid containing from 0.002 to 0.5% by weight, based on the ethylene copolymer, of a free-radical polymerization initiator to diffuse into the ethylene copolymer at temperatures up to 100°C, and extruding the mixture at temperatures which are from 5° to 100°C above the crystallite melting point of the ethylene copolymer.

Examples of suitable ethylene copolymers are copolymers of ethylene and vinyl esters derived from saturated carboxylic acid of from 1 to 4 carbon atoms. Of these, copolymers of ethylene and vinyl acetate and ethylene and vinyl propionate are particularly preferred. Other suitable ethylene copolymers are those in which the comonomers are derived from esters of acrylic and methacrylic acids with alcohols of from 1 to 18 carbon atoms. The comonomer content of the ethylene copolymers is up to 50% by weight and is preferably in the range between 5 and 40% by weight. Suitable ethylene copolymers have a melt index of from 0.5 to 100 g/10 min. (as determined according to ASTM D 1238/65 T at a temperature of 190°C and a load of 2.16 kg).

Preferred ethylenically unsaturated polymerizable carboxylic acids are acrylic acid and methacrylic acid in amounts of from 0.5 to 10% by weight, based on the ethylene copolymer. Another suitable ethylenically unsaturated carboxylic acid is maleic anhydride.

The free-radical initiators required for the graft polymerization are dissolved in the ethylenically unsaturated carboxylic acids in amounts of from 0.002 to 0.5% by weight, based on the ethylene copolymer. Suitable free-radical polymerization initiators are all commonly used peroxides, hydroperoxides and azo compounds. For example, use may be made of dibenzoyl peroxide, dicumyl peroxide, di-t-butyl peroxide, cumene hydroperoxide and azodiisobutyronitrile.

The above ethylene copolymers are used in the form of shaped articles, for example granules, such as are formed in the manufacture of the copolymers. The diameter of the shaped articles is not more than 10 mm and is usually from 3 to 6 mm. The length of the shaped articles may be from 2 to 5 mm. The shaped articles may be, say, cylindrical or spherical. The shaped articles of ethylene copolymer are generally mixed with the ethylenically unsaturated carboxylic acids containing dissolved free-radical polymerization initiator at room temperature. If desired, however, the components may be mixed at temperatures between 20° and 100°C, provided that no polymerization of the ethylenically unsaturated carboxylic acid takes place at this stage. The residence time during mixing depends on the comonomer content of the copolymer and on the amount of ethylenically unsaturated carboxylic acid used. When the proportion of comonomer is high and the amount of carboxylic acid is low, the residence time may be short. Mixing of the components must be carried out over a specific minimum residence time, since the ethylenically unsaturated carboxylic acid and the polymerization initiator must be uniformly distributed throughout the polymer.

The mixture is then fed to an extruder in which it is melted under mild mechanical conditions and then extruded. The temperatures used are from 5° to 100°C and preferably from 20° to 50°C above the crystallite melting point of the ethylene copolymer. Under these conditions, the ethylenically unsaturated carboxylic acid is grafted onto the ethylene copolymer. It is important to ensure that only minimum shear is applied to the polymer by the screw of the extruder. The heat required for melting should be mainly applied by external heating. It has been found advantageous to carry out the process using screws of constant pitch, so-called conveying screws, screws such as are used for mixing rubber, or screws with a slightly increasing core diameter. The rotary speed of the screws should be as low as possible. The total amount of heat applied to the mixture during fusion and extrusion thereof in the form of heat of shear should be less than 50% and preferably less than 30% of the total amount of heat necessary.

The products obtained in the process of the invention are highly suitable for the manufacture of sheeting. Sheeting made from these polymers exhibits no fish-eyes, unlike sheeting made from the graft polymers prepared by prior art processes.

The invention is further described with reference to the following Examples, in which the parts are by weight.

EXAMPLE 1

100 parts of a copolymer of 88 parts of ethylene and 12 parts of vinyl acetate and having a melt index of 6 g/10 min (190°C/2.16 kg) and 3 parts of acrylic acid containing 0.03 part of dissolved dibenzoyl peroxide are mixed for 10 minutes at a temperature of 20°C. The ethylene copolymer is used in the form of cylindrical granules having a diameter of 3 mm and a length of 4 mm. On completion of this mixing operation, the granules are completely dry. Following a residence time of 4 hours, the mixture is melted in an extruder having a screw of constant pitch and an l/d ratio of 27, the speed of the screw being 12 rpm and the temperature used being 140°C. The amount of heat applied in the form of heat of shear is found to be less than 30%. There is obtained of product having an acid number of 32. It is readily converted to sheeting showing no fish-eyes.

If the same mixture is fused in the same extruder at a high screw speed and without external heating, the graft product thus obtained shows a large number of fish-eyes and is therefore unsuitable for sheeting manufacture.

EXAMPLE 2

100 parts of a granular copolymer of 82 parts of ethylene and 18 parts of n-butyl acrylate and having a melt index of 2 g/10 min (190°C/2.16 kg) and 4 parts of acrylic acid containing 0.04 part of dissolved dibenzoyl peroxide, are mixed for 10 minutes at a temperature of 20°C. The granules are cylindrical and have a length of 4 mm and a diameter of 3 mm. 3 hours after mixing, the granules are extruded at a temperature of 150°C. The energy consumed by the screw gives a heat of shear of less than 30%. There is obtained a graft polymer having an acid number of 38. Sheeting prepared from this reaction product shows no fish-eyes. With increasing speed of the screw and increasing energy consumption, the product becomes increasingly non-uniform.

If the mixture of granules and carboxylic acid is extruded immediately after mixing, the product obtained is not suitable for the manufacture of sheeting, since the sheeting produced from it contains a large number of fish-eyes.

We claim:

1. A process for manufacturing homogeneous graft polymers of ethylene copolymers and ethylenically unsaturated carboxylic acids which comprises:
   a. mixing granules of an ethylene/vinyl ester, ethylene/acrylate or ethylene/methacrylate copolymer having a diameter of from 1 to 10 mm and from 0.5 to 10% by weight, based on the ethylene copolymer, of an ethylenically unsaturated carboxylic acid containing from 0.002 to 0.5% by weight, based on the ethylene copolymer, of a free-radical polymerization initiator at a temperature of from 20° to 100°C whereby said ethylenically unsaturated carboxylic acid is caused to diffuse into the ethylene copolymer, and
   b. passing said mixture to an extruder wherein said mixture is subjected to shear forces at a temperature of from 5° to 100°C above crystallite melting point of the copolymer whereby a homogeneous graft polymer is formed, the heat applied to the mixture extrusion thereof in the form of heat of shear is less than 50% of the total heat necessary.

2. A process set forth in claim 1 wherein the diameter of the granules is from 3 to 6 mm.

3. A process as set forth in claim 1 wherein said ethylenically unsaturated carboxylic acids is selected from the group consisting of acrylic acid, methacrylic acid and maleic acid anhydride.

* * * * *